United States Patent
Mok et al.

(10) Patent No.: US 7,893,674 B2
(45) Date of Patent: Feb. 22, 2011

(54) SWITCH MODE POWER SUPPLY (SMPS) AND METHODS THEREOF

(75) Inventors: Ken Tsz Kin Mok, San Diego, CA (US); Justin Joseph Rosen Gagne, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 205 days.

(21) Appl. No.: 11/862,044

(22) Filed: Sep. 26, 2007

(65) Prior Publication Data

US 2009/0079401 A1    Mar. 26, 2009

(51) Int. Cl.
G05F 1/575 (2006.01)
G05F 1/618 (2006.01)

(52) U.S. Cl. ...................... 323/283; 323/284

(58) Field of Classification Search ............. 323/224, 323/282, 283, 284, 285; 361/111
See application file for complete search history.

(56) References Cited

U.S. PATENT DOCUMENTS

| | | | | |
|---|---|---|---|---|
| 6,031,362 | A * | 2/2000 | Bradley | 323/269 |
| 7,554,310 | B2 * | 6/2009 | Chapuis et al. | 323/282 |
| 7,570,036 | B2 * | 8/2009 | Tang et al. | 323/283 |
| 7,701,190 | B2 * | 4/2010 | Chen et al. | 323/288 |
| 2006/0022653 | A1 | 2/2006 | Reed et al. | |

FOREIGN PATENT DOCUMENTS

EP    0779568    6/1997
WO    WO0277742    3/2002

OTHER PUBLICATIONS

International Search Report and Written Opinion - PCT/US2008/077550, International Search Authority - European Patent Office - Feb. 18, 2009.
Guang Feng et al: "A New Digital Control Algorithm to Achieve Optimal Dynamic Performance in DC-to-DC Converters" IEEE Transactions on Power Electronics, IEEE Service Center, Piscataway, NJ, US, vol. 22, No. 4, Jul. 1, 2007, pp. 1489-1498, XP011186911 ISSN: 0885-8993.
Kelly A.et al: "Sensorless current-mode control of a digital dead-beat DC-DC converter" Applied Power Electronics Conference and Exposition, 2004. APEC 04. Nineteenth Annual IEEE Anaheim, CA, USA Feb. 22-26, 2004, Piscataway, NJ, USA, IEEE, vol. 3, Feb. 22, 2004, pp. 1790-1795, XP010703502 ISBN: 978-0-7803-8269-5 paragraph [OIII]; figure 1.

* cited by examiner

Primary Examiner—Gary L Laxton
(74) Attorney, Agent, or Firm—William M. Hooks (57) ABSTRACT

Embodiments of the present invention are directed to switched-mode power supply (SMPS) circuits and methods thereof. The SMPS circuit receives information related to a future load change. For example, the information may be received at a decoder (e.g., a serial bus interface (SBI) decoder) from a microprocessor or microcontroller, such as a mobile station modem (MSM). The SMPS circuit may include an analog-to-digital converter configured to sample an output voltage of the SMPS circuit to determine a time when the future load change occurs. The SMPS circuit may further include a transient recovery circuit (TRC) for stabilizing the output voltage based on the received information when the future load change occurs. For example, the TRC calculates a duty cycle used to transition states of switches of the SMPS circuit to compensate for the future load change.

27 Claims, 4 Drawing Sheets

FIG. 1A
(Conventional Art)

FIG. 1B
"On State"
(Conventional Art)

FIG. 1C
"Off State"
(Conventional Art)

FIG. 4
"TRC MODE"

SWITCH MODE POWER SUPPLY (SMPS) AND METHODS THEREOF

BACKGROUND OF THE INVENTION

1. Field of the Invention

The invention relates generally to switch mode power supply (SMPS) circuits and methods thereof, and more particularly to feed forward SMPS circuits and methods thereof.

2. Description of the Related Art

A switched-mode power supply, switch-mode power supply, or SMPS, is an electronic power supply unit (PSU) that incorporates a switching regulator, which is an internal control circuit that switches power transistors (e.g., MOSFETs) rapidly on and off in order to stabilize the output voltage or current. Switching regulators are typically used as replacements for the linear regulators when higher efficiency, smaller size or lighter weight is required. However, switching regulators are more complicated and their switching currents can cause noise problems if not carefully suppressed.

SMPS can be classified based on input and output waveforms, as a rectifier or off-line converter (AC in; DC out), a voltage/current or DC to DC converter (DC in; DC out), a frequency changer or cyclo-converter (AC in; AC out) and an inverter (DC in; AC out).

A buck converter is an example of a step-down DC to DC converter. The design of a buck converter is similar to that of a boost converter (i.e., a step-up DC to DC converter). A buck converter is relatively efficient (e.g., up to 95% for integrated circuits) compared to linear regulators.

A conventional buck converter typically includes two switches (e.g., a transistor and a diode) as well as an inductor and a capacitor for filtering of the output voltage ripple. A synchronous buck converter is a modified version of the basic buck converter circuit topology in which the diode is replaced by a second transistor. This modification is a tradeoff between increased cost and improved efficiency. Generally, the buck converter alternates between connecting the inductor to a source voltage to store energy in the inductor ("on state") and discharging the inductor into a load ("off state").

Figure 1A:
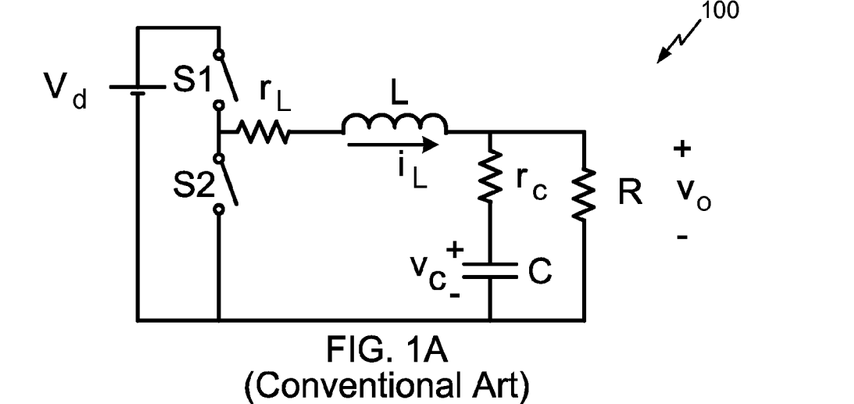
FIGS. 1A, 1B and 1C illustrate a conventional synchronous buck converter.

FIG. 1A illustrates a conventional synchronous buck converter 100. As shown in FIG. 1A, the conventional synchronous buck converter 100 includes a power supply voltage $V_d$, a first switch $S_1$ and a second switch $S_2$, an inductor L, and a capacitor C. Resistors $r_L$ and $r_c$ represent the effective series resistance (ESR) associated with the inductor and the capacitor respectively, whereas resistor R represents the load. Generally, the power supply voltage $V_d$ corresponds to the DC input voltage of the synchronous buck converter 100, and the voltage $V_o$ across the resistor R corresponds to the DC output voltage.

Figure 1B:
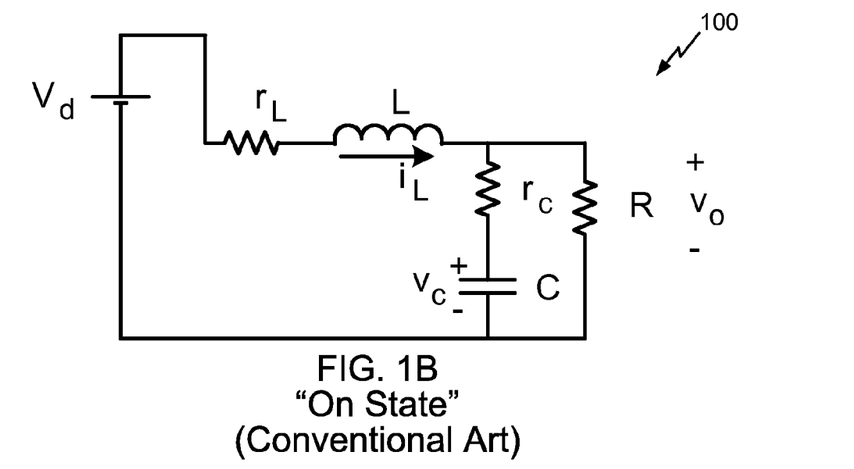
Figure 1C:
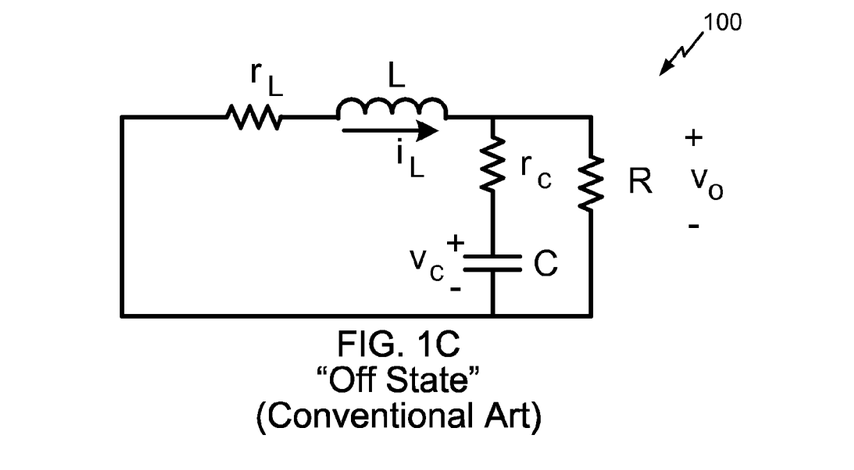

As discussed above, buck converters operate by switching between an "on state" and an "off state". Referring to FIG. 1A, during the "on state", switch $S_1$ is closed and switch $S_2$ is opened. In contrast, during the "off state", switch $S_2$ is closed and switch $S_2$ is opened. Thus, the first and second switches $S_1$ and $S_2$ are always set to a different operating status. Accordingly, FIGS. 1B and 1C illustrate the on and off states, respectively, of the synchronous buck converter 100.

Conventionally, the switching of the first and second switches $S_1$ and $S_2$ is controlled by a feedback circuit (not shown) that monitors the output voltage $V_o$ and compares the output voltage $V_o$ with a reference voltage, which is set manually or electronically to the desired output. If there is an error in the output voltage $V_o$, the feedback circuit compensates by adjusting the timing with which the first and second switches $S_1$ and $S_2$ are switched on and off. For example, the switching regulator portion of the feedback circuit may be embodied as a proportional-integral-derivative controller (PID) controller. A PID controller is a well-known control loop feedback mechanism widely used in industrial control systems. Generally, a PID controller attempts to correct the error between a measured process variable (i.e., the feedback output voltage $V_o$) and a desired set-point (i.e., the reference voltage) by calculating and then outputting a corrective action, or compensation signal (i.e., adjustments to the $S_1/S_2$ switching) that can adjust the process accordingly.

Output voltage ripple is the name given to the phenomenon where the output voltage $V_o$ rises during the On-state and falls during the Off-state. Several factors contribute to this including, but not limited to, switching frequency, output capacitance, inductor, ESR, load and any current limiting features of the control circuitry. At the most basic level the output voltage will rise and fall as a result of the output capacitor charging and discharging. Further, buck converters typically output the output voltage $V_o$ to a load (i.e., resistor R). If the load current changes relatively quickly, the conventional buck converter 100 may have difficulty handling the load change (e.g., because the feedback circuit may over or under-compensate for the load change). Accordingly, if the load is changed, the output voltage ripple may increase, which degrades system performance.

SUMMARY OF THE INVENTION

An embodiment of the present invention is directed to a method of stabilizing voltage output from a switched-mode power supply (SMPS) circuit, including receiving information related to a future load change, sampling an output voltage to determine a time when the future load change occurs and stabilizing the output voltage based on the received information when the future load change occurs.

Another embodiment of the present invention is directed to a SMPS circuit, including a decoder receiving information related to a future load change, an analog-to-digital converter (ADC) sampling an output voltage to determine a time when the future load change occurs and a transient recovery circuit (TRC) stabilizing the output voltage based on the received information when the future load change occurs.

Another embodiment of the present invention is directed to a SMPS circuit, including means for receiving information related to a future load change, means for sampling an output voltage to determine a time when the future load change occurs and means for stabilizing the output voltage based on the received information when the future load change occurs.

Another embodiment of the present invention is directed to a computer-readable medium including program code stored thereon, the program code configured for execution at a SMPS circuit, including program code to receive information related to a future load change, program code to sample an output voltage to determine a time when the future load change occurs and program code to stabilize the output voltage based on the received information when the future load change occurs.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As discussed in the Background section, conventional synchronous buck converters compensate for load changes based on feedback of the output voltage of the buck converter. As discussed below in greater detail, an embodiment of the present invention is directed to using a "feed-forward" approach to handling responses to load changes. Thus, information related to a future load change may be used to better handle a response to the load change. For example, in this manner, over-compensation to a subsequent load change may be reduced because more information related to the load change is known.

Figure 2:
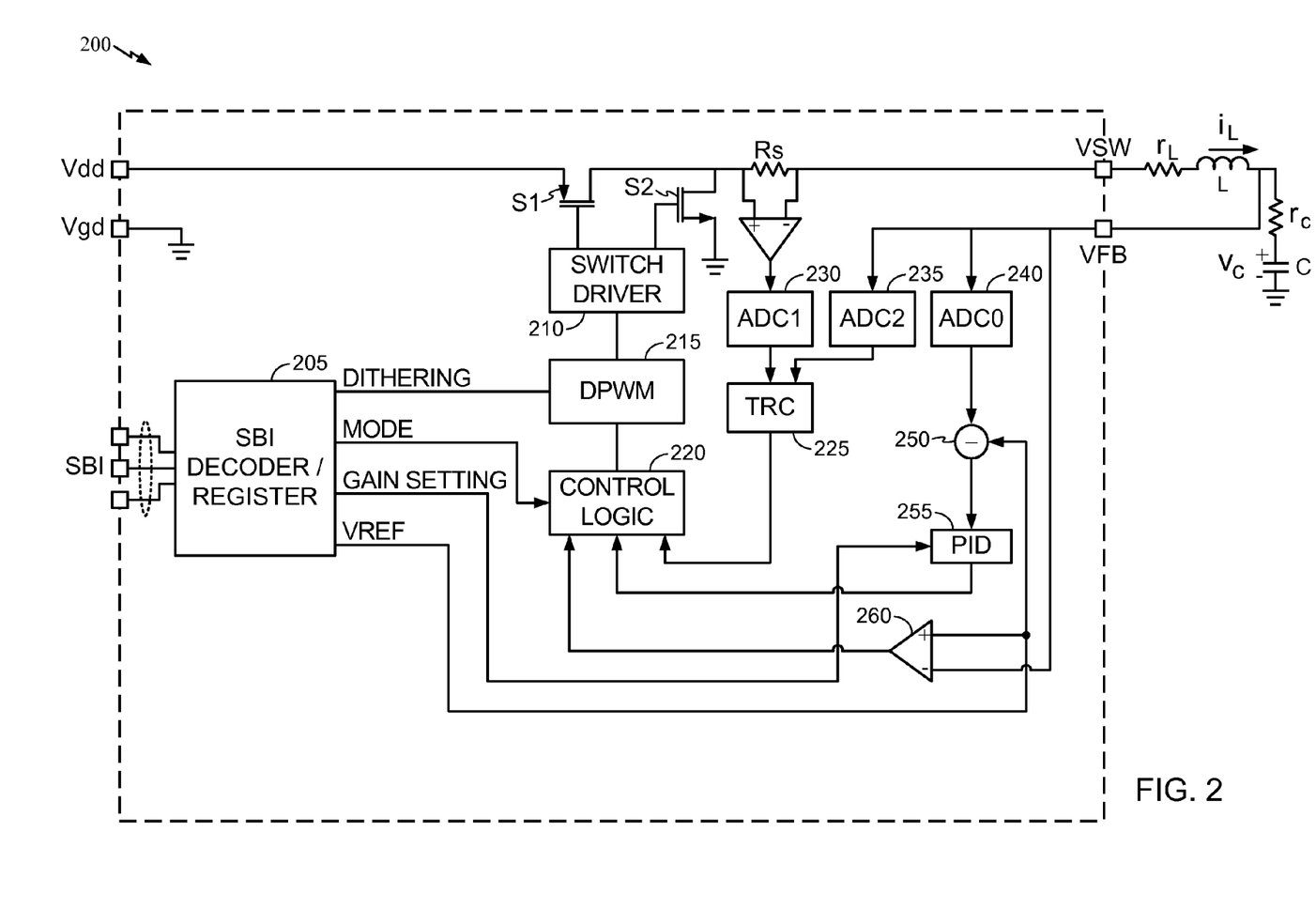
FIG. 2 illustrates a synchronous buck converter according to an embodiment of the present invention.

FIG. 2 illustrates a synchronous buck converter 200 according to an embodiment of the present invention. Referring to FIG. 2, the buck converter 200 includes a serial bus interface (SBI) decoder 205, a switch driver 210 controlling switches S1 and S2, a digital pulse width modulator (DPWM) controller 215 controlling the switch driver 210, control logic 220 controlling the DPWM controller 215, a transient recovery controller (TRC) 225, first, second and third analog-to-digital converters (ADCs) ADC1 230, ADC2 235 and ADC0 240, a sense amplifier 245 configured to sense the inductor current, a combiner 250, a proportional-integral-derivative controller (PID) controller 255 compensation circuitry 260. Also shown in FIG. 2 are resistors $r_L$ and $r_c$, which represent the effective series resistance (ESR) associated with the inductor L and the capacitor C, respectively, whereas resistor R represents the load, as in FIGS. 1A, 1B and 1C.

With respect to FIG. 2, while the buck converter 200 has been illustrated as including the SBI decoder 205, it will be appreciated that a decoder having any type of interface may alternatively be used, and not necessarily an SBI decoder. For example, a parallel bus interface (PBI) decoder may alternatively be used. Thus, while embodiments of the present invention are below described as being directed to an SBI decoder, it will be appreciated the other modifications of the present invention need not be so limited.

The buck converter 200 has three different modes of operation, as will be discussed below in greater detail. The three modes of operation of the buck converter 200 are (i) pulse frequency modulation (PFM) mode ("PFM Mode") for light loads, (ii) pulse wide modulation (PWM) mode ("Regulation Mode") for normal operation, and (iii) transient recovery control (TRC) mode ("TRC Mode") for detection and control of the buck converter 200 during an expected and/or actual load change. Referring to FIG. 2, the SBI decoder 205 provides the interface for changing the settings of the buck converter 200, such as switching between the different modes.

During regulation mode, the output voltage of the buck converter 200 is fed back as feedback voltage Vfb and sampled by ADC0 240. The output of ADC0 240 is subtracted from the reference voltage Vref (e.g., stored at a register of the SBI decoder 205) at the combiner 250 to provide an error signal to the PID controller 255. The PID controller 255, whose gain values can be modified by changing a corresponding SBI register at the SBI Decoder 205, then calculates the duty cycle command. ADC1 230 monitors the inductor current and provides a signal to the switch driver 210 and DPWM controller 215 to reduce an over-current on either the inductor L or the switches S1 and/or S2 (e.g., power field effect transistors (FETs)).

During TRC mode, ADC1 230 is turned on to detect a rapid slope change in the output voltage (e.g., a voltage spike or dip) associated with a load change. The TRC controller 225 then calculates a duty cycle and phase (e.g., an "optimal" duty cycle and phase) based on the inductor current and output voltage measurements, as will be described in greater detail below with respect to FIG. 3.

During PFM mode, the compensation circuitry 260 is activated, which allows the buck converter 260 to handle light load situations more efficiently, such as when a micro-controller or micro-processor (e.g., a mobile station modem (MSM)) is in sleep mode. For purposes of example only, embodiments of the present invention are below described with reference to an MSM. However, it will be appreciated that other embodiments of the present invention may be directed to buck converters used in conjunction with any type of microcontroller or microprocessor, and not necessarily an MSM. The functionality of the compensation circuitry 260 for light-load situations is well-known in the art and will not be discussed further for the sake of brevity.

The control logic 220 determines which set of duty cycle commands (i.e., each "set" being associated with one of the TRC, PFM and regulation modes) should be sent to the DPWM controller 215, and subsequently the switch driver 210. The mode of operation can be determined either autonomously or by a register setting at the SBI Decoder 205.

Referring to FIG. 2, the ADC0 240 provides feedback voltage Vfb for the control loop. The resolution of the ADC0

240 output determines the limit of the set voltage accuracy. In other words, the digital resolution of the ADC0 240 output determines how accurately the output voltage Vsw can be monitored via the feedback voltage Vfb. The sampling rate of the ADC0 240 is set to a sufficiently high sampling frequency so as to handle one or more types of input anti-aliasing filtering. For example, the ADC0 240 may be set to have a 10 bit resolution and sampling frequency equal to or greater than a switching frequency of switches S1/S2 as designated by the switch driver 210.

The ADC2 235 monitors the same signal as the ADC0 240. However, the ADC2 235 is set to a higher sampling rate than the ADC0 240. For example, the sampling rate of the ADC2 235 is set 3-5 times faster than ADC0 240. The higher sampling rate of ADC2 235 enables the ADC2 235, during TRC mode, (i) to more quickly/accurately detect a slope change in the feedback voltage Vfb (i.e., an output voltage spike or dip) associated with a load change and (ii) to provide the TRC 225 with the measured feedback voltage Vfb so as to determine the optimal duty cycle. Accordingly, in an example, ADC2 235 is exclusively activated during TRC mode, and need not be turned on or activated during PFM mode and/or regulation mode.

In an alternative embodiment, ADC2 235 and ADC0 240 may be consolidated into a single ADC. In such an alternative embodiment, the "combination" ADC includes a programmable sampling rate to enable the combination ADC to have higher sampling rates during TRC mode, and lower sampling rates during PFM mode and/or regulation mode. The combination ADC may reduce the size of the buck converter 200, but may also be more expensive than two ADCs with fixed sampling rates.

Referring to FIG. 2, ADC1 230 monitors the inductor current iL through a small sense resistor Rs. Alternatively, the sense resistor Rs may be replaced with another type of element, such as a transimpedance amplifier.

During TRC mode, the instantaneous inductor current is measured by the ADC1 230. The measured instantaneous inductor current is used by the TRC 225 to determine the optimal duty cycle for a specified load change. The sampling frequency of the ADC2 235 is set higher than that of the switching frequency (i.e., of switches S1/S2) during TRC mode. In an example, in order to reduce power consumption, ADC2 235 need only be activated during the TRC mode and is otherwise disabled.

Referring to FIG. 2, the DPWM controller 215 takes the digital value of the duty cycle, d(n), and produces a pulse train, or series of signals, for turning the power transistors (i.e., switches S1 and S2) of the buck converter 200 ON and OFF. In an example, the DPWM controller 215 may be configured to use a higher resolution than that of the ADC (e.g., higher than 10 bits), such that the ADC bits corresponding to the reference voltage Vref may be mapped to a DPWM level.

The effective resolution of the DPWM can be enhanced by "dithering", which means to vary the duty cycle by a least significant bit (LSB) over a few switching periods to achieve an average duty cycle that has a value between two adjacent quantized duty cycle levels. Additional AC ripple at the output of the converter may be created as a result of dithering. However, the additional ripple can be reduced by selecting a dithering pattern so as to take advantage of the low-pass characteristic of the output LC filter.

As an example, two sets of 3-bit dithering sequences are shown in Tables 1 and 2 (below). The dithering sequence in Table 1 takes the form of a simple rectangular waveform, whereas the dithering sequence in Table 2 is configured to reduce the low frequency spectral content. As a result, the dithering sequence in Table 2 produces lower ripple for a given average duty cycle compared to the dithering sequence in Table 1. In an example, the dithering sequence in Table 2 can be implemented in the form of a look-up table where the $2^{N_{dith}}$ ($N_{dith}$ being the dithering resolution) dithering sequences are stored.

TABLE 1

| Average Duty Cycle | "Rectangular" Dithering Sequence | | | | | | | | Ripple Content |
|---|---|---|---|---|---|---|---|---|---|
| 0 | 0 | 0 | 0 | 0 | 0 | 0 | 0 | 0 | None |
| 1/8 | 0 | 0 | 0 | 0 | 0 | 0 | 0 | 1 | Lowest |
| 2/8 | 0 | 0 | 0 | 0 | 0 | 0 | 1 | 1 | |
| 3/8 | 0 | 0 | 0 | 0 | 0 | 1 | 1 | 1 | |
| 4/8 | 0 | 0 | 0 | 0 | 1 | 1 | 1 | 1 | Highest |
| 5/8 | 0 | 0 | 0 | 1 | 1 | 1 | 1 | 1 | |
| 6/8 | 0 | 0 | 1 | 1 | 1 | 1 | 1 | 1 | |
| 7/8 | 0 | 1 | 1 | 1 | 1 | 1 | 1 | 1 | Lowest |

TABLE 2

| Average Duty Cycle | Dithering Sequence | | | | | | | | Ripple Content |
|---|---|---|---|---|---|---|---|---|---|
| 0 | 0 | 0 | 0 | 0 | 0 | 0 | 0 | 0 | None |
| 1/8 | 0 | 0 | 0 | 0 | 0 | 0 | 0 | 1 | Lowest |
| 2/8 | 0 | 0 | 0 | 1 | 0 | 0 | 0 | 1 | |
| 3/8 | 0 | 0 | 1 | 0 | 0 | 1 | 0 | 1 | |
| 4/8 | 0 | 1 | 0 | 1 | 0 | 1 | 0 | 1 | Highest |
| 5/8 | 0 | 1 | 0 | 1 | 1 | 0 | 1 | 1 | |
| 6/8 | 0 | 1 | 1 | 1 | 0 | 1 | 1 | 1 | |
| 7/8 | 0 | 1 | 1 | 1 | 1 | 1 | 1 | 1 | Lowest |

Figure 3:
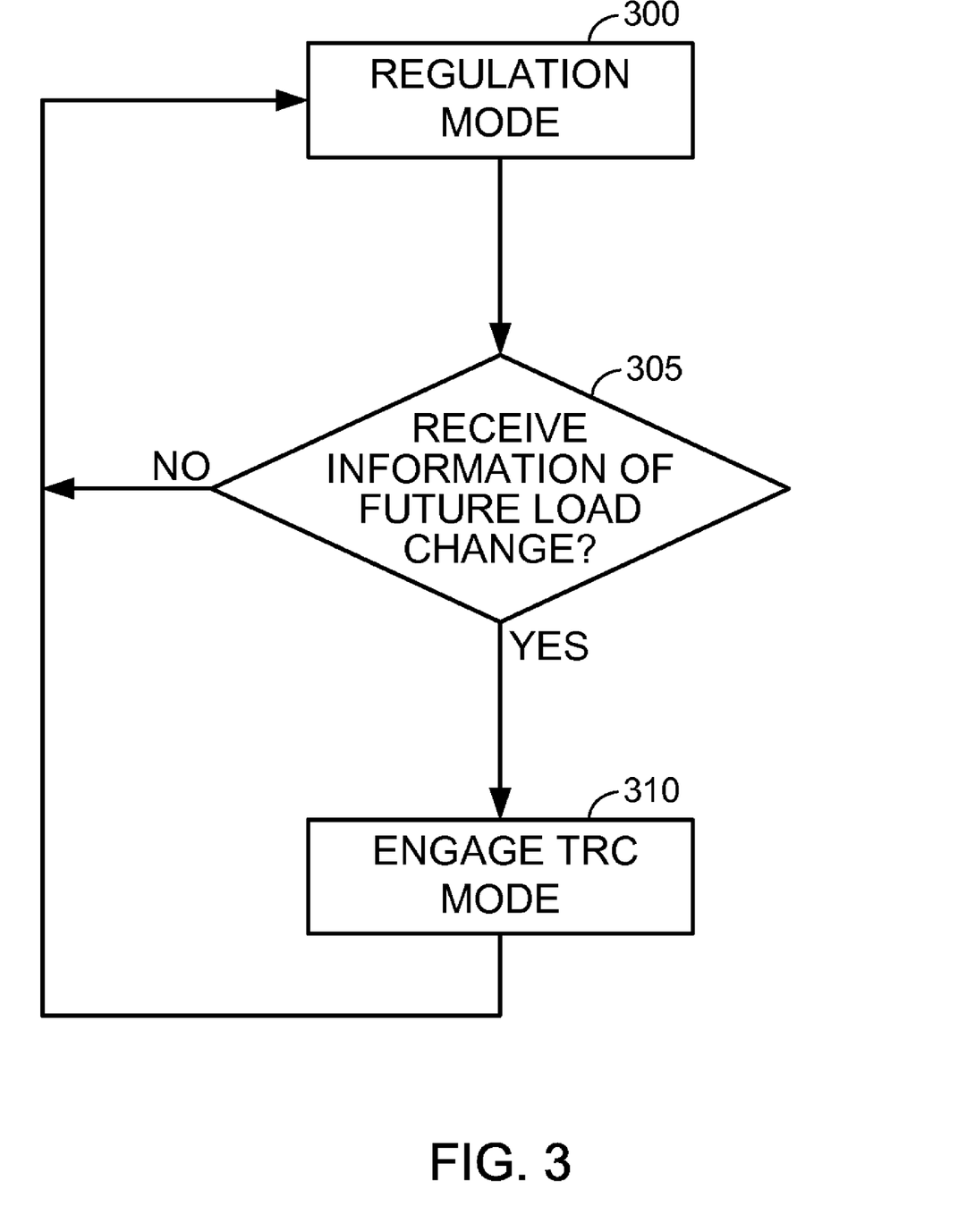
FIG. 3 illustrates a voltage regulation process accordance to an embodiment of the present invention.

As discussed above, the buck converter 200 operates in one of three modes (PFM mode, regulation mode and TRC mode) at any given time. FIG. 3 illustrates a voltage regulation process accordance to an embodiment of the present invention. For simplicity of explanation, the process of FIG. 3 illustrates transitions of the buck converter 200 between regulation mode and TRC mode, without reference to PFM mode. However, it will be appreciated that the teachings of FIG. 3 may also be used in conjunction with PFM mode, as the buck converter 200 may alternatively transition to/from PFM mode to/from either the regulation mode or the TRC mode based on load conditions.

In 300, assume the buck converter 200 is operating in a default state, or regulation mode. During regulation mode, as discussed above, feedback control is used to regulate the output voltage within a given voltage range via the PID controller 255. Next, in 305, the buck converter 200 determines whether information has been received from the MSM regarding a future load change. For example, the MSM may anticipate a future load change a period of time before which the MSM transitions from "sleep mode" to an "active mode". In another example, the MSM may anticipate a future load change when additional resources are expected to be triggered during the active mode (e.g., an application is executed which is associated with a known load change). The amount of load current required by the MSM is closely related to the internal clock frequencies. For example, the MSM can decide to run at different clock frequencies depending on the computation complexity of a particular task. The "degree" of load current corresponds to a particular frequency and can be determined using a look up table, for example. In other words, the amount of processing power expected for any given computational task can be "mapped" (e.g., in a mapping or look-up table) to the degree of expected load change in order to provide "feed-forward" information to the buck converter 200 regarding an upcoming or future load change. The lookup table itself can be generated by testing the actual load changes under different processing stresses.

For example, in 305, prior to a load change (e.g. before the MSM undergoes a transition between sleep mode and active mode), the MSM sends an interrupt to acknowledge the buck controller. The information of the load current required is then loaded into the memory (register) of the buck controller 200, which triggers the buck converter 200 to engage in transient detection mode, or TRC mode.

Figure 4:
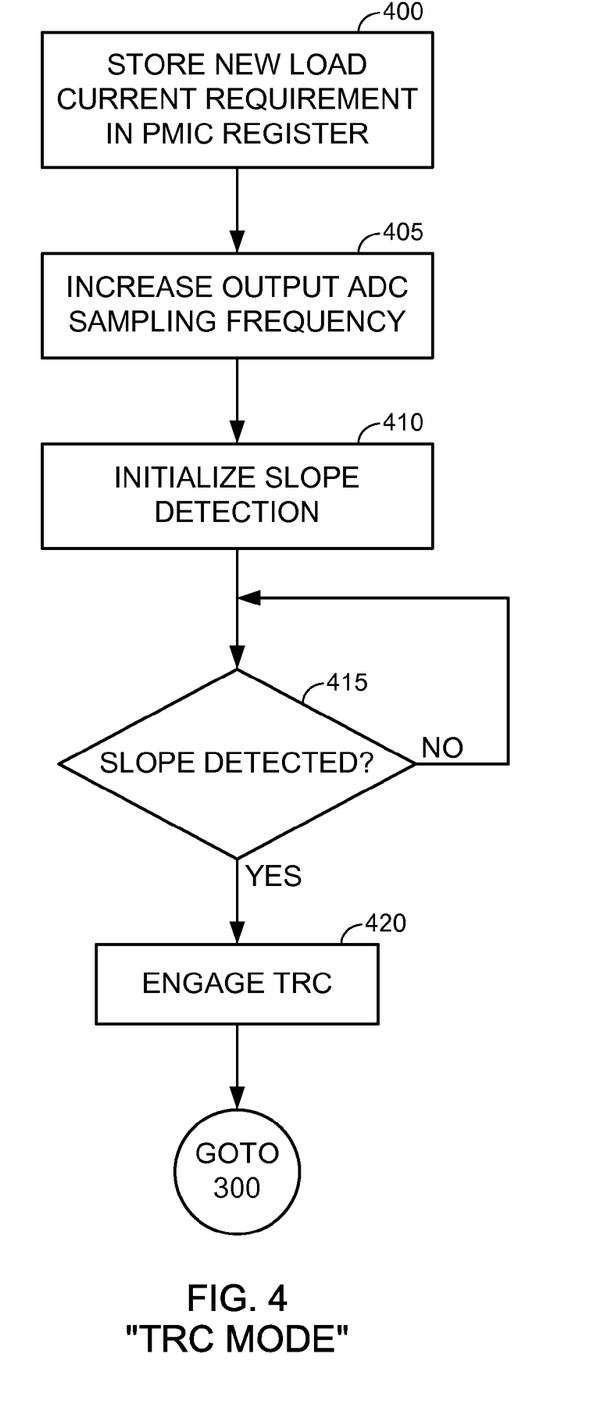
FIG. 4 illustrates operations performed by the buck converter of FIG. 2 during TRC mode according to an embodiment of the present invention.

Upon determining that information related to a future load change has been received in 305, the buck converter 200 transitions from regulation mode to TRC mode in 310. FIG. 4 illustrates operations performed by the buck converter 200 during TRC mode according to an embodiment of the present invention.

In 400 of FIG. 4, a register associated with the buck converter 200 stores a new load current requirement (i.e., a target current to be used after the reported load change). Next, in 405, the higher sampling rate ADC1 230 and ADC2 235 are activated. Generally, there is a distinct spike or dip in the output voltage waveform associated with a load current increase or decrease, respectively. Thus, during TRC mode, ADC2 235 is activated to monitor the output voltage in anticipation of the spike or dip which is detected by a slope detection process. The slope detection process continues in 415 until a slope, which is presumed to correspond to the "future" load change, is detected. In an alternative example, if the "combination ADC" is used in place of ADC0 240 and ADC2 235, respectively, then the programmable sampling rate combination ADC may transition to a higher sampling rate in 405.

ADC1 230 remains engaged/activated at least until the load change is detected. After the transient spike or dip is detected, TRC algorithms are executed, 420, at the TRC 225 to determine the optimal duty cycle command, as well as the optimal phase for the switching period required to ramp up or ramp down the inductor current to the desired value.

The optimal duty cycle d(q) for ramping up or ramping down the inductor current to a desired value is determined based on the following equations:

For increase in load current:

$$d(q) = L \cdot \left( \frac{i_{MSM} - i_L}{V_d - v_o} \right) \cdot f_S \qquad \text{Equation 1}$$

For decrease in load current:

$$d(q) = L \cdot \left( \frac{i_{MSM} - i_L}{0 - v_o} \right) \cdot \frac{1}{T_S} \qquad \text{Equation 2}$$

where $i_{MSM}$ is the amount of current requested by the MSM, $f_s$ is the switching frequency, L is the inductance of the inductor L (e.g., calculated as shown below in Equation 3), $i_L$ is the current across the inductor L, $V_o$ is the output voltage of the buck converter 200, and $T_s$ is the period for switching, or $1/f_s$.

The inductance can be estimated online based on the following equation:

$$v_L = L \frac{di_L}{dt} \Rightarrow L = \frac{\int_{t_o}^{t_1} v_L(t) dt}{i_L(t_1) - i_L(t_o)} \qquad \text{Equation 3}$$

The inductance estimation shown in Equation 3 may be executed during system start up/initialization, and/or periodically during operation to account for inductance variation due to temperature change.

In order to increase the effectiveness of the TRC algorithm, a phase reversal function may be included. In normal operation, a complete switching period includes a certain amount of ON time followed by a certain portion of OFF time. During the ON time, the inductor current increases, whereas during the OFF time the inductor current decreases. The proportion between the ON time and OFF time is determined by the duty cycle.

When there is a load change, the inductor current iL needs to be ramped up or ramped down quickly to improve the transient response and reduce transient ripple. To facilitate this "ramping", when the load current is increased, the switching cycle immediately following the load change can be set to an ON state followed by an OFF state so that the inductor current can decrease relatively quickly. Conversely, if the load current is decreased, the switching cycle immediately following the load change can be set to an OFF state followed by an ON state so that the inductor current can decrease relatively quickly.

Accordingly, in 420, the buck converter 200 switches the switches S1 and S2 in accordance with the calculated duty cycle d(q) from either Equation 1 or Equation 2 in an order (e.g., OFF followed by ON, ON followed by OFF, etc.) based on whether current is being increased or decreased, as discussed above. After 420, the buck converter 200 transitions back to 300 of FIG. 3 and re-engages regulation mode.

While the above-described embodiments of the present invention have been directed generally to synchronous buck converters, it will be appreciated that other embodiments of the present invention may be directed to any type of SMPS circuit, such as a rectifier, inverter, a non-synchronous buck converter, a boost converter, a buck-boost converter, a synchronous buck-boost converter, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of stabilizing voltage output from a switched-mode power supply (SMPS) circuit, comprising:
   receiving information related to a future load change;
   sampling an output voltage to determine a time when the future load change occurs, wherein the sampling of the output voltage is based at least in part based upon the received information; and
   stabilizing the output voltage based on the received information when the future load change occurs.

2. The method of claim 1, wherein the sampling step determines whether the sampled output voltage indicates a voltage fluctuation indicative of the future load change.

3. The method of claim 1, wherein the received information indicates a degree of the future load change.

4. The method of claim 3, wherein the degree of the future load change is estimated based on an expected processing load at one of a microcontroller and microprocessor.

5. The method of claim 1, wherein the sampling step samples the output voltage at a higher rate after the receiving step receives the information related to the future load change as compared to operation where information related to the future load change has not been received.

6. The method of claim 1, wherein the receiving step triggers a transient recovery circuit (TRC) mode, the TRC mode including the sampling and stabilizing steps.

7. The method of claim 6, further comprising:
   transitioning from the TRC mode to one of a regulation mode and a pulse frequency modulation (PFM) mode after the stabilizing step.

8. The method of claim 7, wherein the regulation mode is associated at least with normal-load operation of the SMPS circuit and PFM mode is associated with light-load operation of the SMPS circuit.

9. The method of claim 1, wherein the stabilizing step includes:
   calculating a duty cycle based on the received information; and
   transitioning states of first and second switches of the SMPS circuit based on the calculated duty cycle.

10. The method of claim 9, wherein, if the future load change indicates a load current increase, the calculating step calculates the duty cycle based on:

$$d(q) = L \cdot \left( \frac{i_{MSM} - i_L}{V_d - v_o} \right) \cdot f_S$$

where $i_{MSM}$ is an amount of current indicated by the received information, L is the inductance of an inductor of the SMPS circuit, $i_L$ is a current across the inductor, $V_o$ is the sampled output voltage and $f_s$ is the switching frequency of the first and second switches of the SMPS circuit.

11. The method of claim 10, wherein the inductance L is calculated based on:

$$v_L = L \frac{di_L}{dt} \Rightarrow L = \frac{\int_{t_o}^{t_1} v_L(t) dt}{i_L(t_1) - i_L(t_o)}$$

wherein $v_L$ is the voltage across the inductor.

12. The method of claim 9, wherein, if the future load change indicates a load current decrease, the calculating step calculates the duty cycle based on:

$$d(q) = L \cdot \left( \frac{i_{MSM} - i_L}{0 - v_o} \right) \cdot \frac{1}{T_S}$$

where $i_{MSM}$ is an amount of current indicated by the received information, L is the inductance of an inductor of the SMPS circuit, $i_L$ is a current across the inductor, $V_o$ is the sampled output voltage and $T_s$ is a switched period for the first and second switches.

13. The method of claim 12, wherein the inductance L is calculated based on:

$$v_L = L \frac{di_L}{dt} \Rightarrow L = \frac{\int_{t_o}^{t_1} v_L(t) dt}{i_L(t_1) - i_L(t_o)}$$

wherein $v_L$ is the voltage across the inductor.

14. The method of claim 1, wherein the SMPS circuit is one of a buck converter, a rectifier, an inverter, a synchronous buck converter, a non-synchronous buck converter, a boost converter, a buck-boost converter or a synchronous buck-boost converter.

15. A switched-mode power supply (SMPS) circuit, comprising:
- a decoder configured to receive information related to a future load change;
- an analog-to-digital converter (ADC) configured to sample an output voltage to determine a time when the future load change occurs, wherein the ADC samples the output voltage based at least in part upon the received information; and
- a transient recovery circuit (TRC) configured to stabilize the output voltage based on the received information when the future load change occurs.

16. The SMPS circuit of claim 15, wherein the decoder is a serial bus interface (SBI) decoder.

17. The SMPS circuit of claim 15, wherein the ADC is used to determine whether the sampled output voltage indicates a voltage fluctuation indicative of the future load change.

18. The SMPS circuit of claim 15, wherein the received information indicates a degree of the future load change.

19. The SMPS circuit of claim 15, wherein the degree of the future load change is estimated based on an expected processing load at one of a microcontroller or microprocessor.

20. The SMPS circuit of claim 15, wherein the ADC is configured to sample the output voltage at a higher rate after the decoded receives the information related to the future load change when compared to operation where information related to the future load change has not been received.

21. The SMPS circuit of claim 15, wherein the decoder is configured to receive the information related to the future load change triggers a transient recovery circuit (TRC) mode of the SMPS circuit, the TRC mode being characterized by the ADC performing the sampling step and the TRC performing the stabilizing step.

22. The SMPS circuit of claim 15, wherein the TRC is configured to calculate a duty cycle based on the received information.

23. The SMPS circuit of claim 22, further comprising:
- a switch driver configure to transition states of first and second switches of the SMPS circuit based on the calculated duty cycle.

24. The SMPS circuit of claim 15, wherein the SMPS circuit is one of a buck converter, a rectifier, inverter, a synchronous buck converter, a non-synchronous buck converter, a boost converter, a buck-boost converter or a synchronous buck-boost converter.

25. A switched-mode power supply (SMPS) circuit, comprising:
- means for receiving information related to a future load change;
- means for sampling an output voltage to determine a time when the future load change occurs, wherein the means for sampling samples the output voltage based at least in part upon the received information; and
- means for stabilizing the output voltage based on the received information when the future load change occurs.

26. A computer-readable storage medium comprising instruction, which when executed by a switched-mode power supply (SMPS) circuit, cause the SMPS circuit to perform operations, the instructions comprising:
- program code to receive information related to a future load change;
- program code to sample an output voltage to determine a time when the future load change occurs, wherein the program code to sample samples the output voltage based at least in part upon the received information; and
- program code to stabilize the output voltage based on the received information when the future load change occurs.

27. The method of claim 1, wherein the received information is received before the future load change is initiated.

* * * * *